United States Patent [19]

Wittmann et al.

[11] Patent Number: 4,891,046
[45] Date of Patent: Jan. 2, 1990

[54] TINTED CONTACT LENS AND METHOD FOR PREPARATION WITH DICHLOROTRIAZINE REACTIVE DYE

[75] Inventors: Joseph W. Wittmann, Rochester; John M. Evans, Greece, both of N.Y.

[73] Assignee: CooperVision, Inc., San Jose, Calif.

[21] Appl. No.: 589,747

[22] Filed: Mar. 15, 1984

[51] Int. Cl.⁴ .......................... D06P 5/00; C09B 62/00
[52] U.S. Cl. ............................................. 8/507; 8/509; 8/549
[58] Field of Search ..................................... 8/507, 549

[56] References Cited

U.S. PATENT DOCUMENTS

| | | | |
|---|---|---|---|
| 3,476,499 | 11/1969 | Wichterle | 8/4 |
| 3,679,504 | 7/1972 | Wichterle | 156/62 |
| 3,937,680 | 2/1976 | de Carle | 260/29.6 T A |
| 4,093,361 | 6/1978 | Erickson et al. | 351/160 |
| 4,123,407 | 10/1978 | Gordon | 260/29.6 T A |
| 4,157,892 | 6/1979 | Tanaka et al. | 8/14 |
| 4,252,421 | 2/1981 | Foley | 351/162 |
| 4,468,229 | 8/1984 | Su | 8/507 |

FOREIGN PATENT DOCUMENTS

| | | |
|---|---|---|
| 0082026 | of 0000 | European Pat. Off. |
| 8303480 | of 0000 | Int'l Pat. Institute |
| 7480190 | of 0000 | Japan |
| 74113846 | of 0000 | Japan |
| 1237629 | of 0000 | United Kingdom |
| 1400892 | of 0000 | United Kingdom |
| 1547525 | of 0000 | United Kingdom |
| 1583492 | of 0000 | United Kingdom |
| 1004424 | 9/1965 | United Kingdom |
| 1163617 | 9/1969 | United Kingdom |
| 2105061 | 3/1983 | United Kingdom |

OTHER PUBLICATIONS

Newcomer et al., in American Journal of Optometry and Physiological Optics, vol. 54, No. 3, (Mar. 1977), pp. 160–164.

Venkataraman, "The Chemistry of Synthetic Dyes", vol. VI, Academic Press, 1972, p. 2.

*Primary Examiner*—A. Lionel Clingman
*Attorney, Agent, or Firm*—Vorys, Sater, Seymour and Pease

[57] ABSTRACT

Hydrophilic contact lenses comprised of a copolymer of an hydroxyl group-containing monomer and N-vinylpyrrolidone are tinted by impregnating the lens with an aqueous solution of a dichlorotriazine reactive dye and fixing the dye in the lens by contacting the lens with an aqueous alkaline solution.

20 Claims, No Drawings

TINTED CONTACT LENS AND METHOD FOR PREPARATION WITH DICHLOROTRIAZINE REACTIVE DYE

BACKGROUND OF THE INVENTION

1. Field of the Invention

This invention relates to tinted contact lenses and more particularly to a process for tinting contact lenses using reactive dyes.

2. Description of the Prior Art

Contact lenses are frequently tinted or colored for cosmetic or protective purposes. For example, tinted contact lenses may be worn to change or modify the natural color of the iris, or an ultraviolet absorbing lens may be worn after cataract removal to compensate for the loss of the ultraviolet absorption provided by the crystalline lens and thus keep ultraviolet light from reaching the interior of the eye.

It is conventional to color contact lenses by incorporating dyes or pigments, and a number of methods have been disclosed for producing tinted contact lenses containing dyes or pigments. However, many of the methods useful for coloring contact lenses cannot be readily applied to hydrophilic contact lenses. Methods wherein a dye or pigment is merely dispersed within the body of the lens, for example by polymerizing a monomer mixture containing the dye or pigment, are generally unsuitable for coloring hydrophilic contact lenses because the presence of large amounts of water in the highly swollen hydrophilic contact lenses tends to induce migration of the coloring materials. This may occur especially when the lenses are sterilized by boiling in aqueous solution, but may occur even in the aqueous environment of the eye. The disadvantages of such migration are evident, since the lens may fade with the passage of time or the eye may be exposed to coloring materials leached from the lens by the tears. Furthermore, since hydrophilic contact lenses are usually larger in diameter than the cornea, it is conventional to color only the central portion of the lens, so that the color does not appear against the white background of the sclera. In this case, migration of the colorant from the central colored portion to the peripheral colorless portion may produce a cosmetically unacceptable lens.

Examples of lenses made from a material colored by incorporating a solvent (monomer) soluble dye or dispersion of a dye or pigment have been prevalent in the hard contact lens field for many years. In the area of soft hydrophilic lenses this method has been attempted in several instances. Such patents as U.S. Pat. No. 4,252,421 and International Patent Application WO 83/03480 disclose incorporating preformed segments of material previously colored with dyes or pigments into a blank of a hydrophilic polymer suitable for fabricating lenses. U.S. Pat. No. 3,679,504 and British Pat. Nos. 1,163,617 and 1,237,629 teach methods of encapsulating pigments or dyes between polymerised layers of hydrogel materials.

More recently efforts have been made to impart a color to a hydrophilic soft left material in its final water swollen state. This has the advantage that a lens may be tinted as required and obviates the need for maintaining extensive inventories of different types of colored lenses.

A number of known methods for coloring contact lenses rely merely on the dispersion of a dye or pigment in a more or less insoluble form within the lens.

Thus, Newcomer et al., American Journal of Optometry and Physiological Optics 54, 160–164 (1977) disclose the use of adsorbed water-soluble dyes to color hydrophilic contact lenses.

Wichterle, U.S. Pat. No. 3,476,499, discloses coloring a hydrophilic contact lens by diffusing into the lens aqueous solutions of inorganic salts which react within the lens to form an insoluble precipitate.

British Patent 1,547,525, discloses coloring a hydrophilic contact lens by impregnating the lens with an aqueous solution of a color coupler, followed by reaction of the color coupler with a suitable diazonium salt to produce an insoluble azo dye within the lens.

European Patent Application 82026 discloses coloring a hydrophobic contact lens by swelling the lens with a suitable solvent, impregnating the swollen lens with a dye, and removing the swelling solvent from the lens.

British Patent 1,583,492, discloses coloring a hydrophilic contact lens by impregnating with an aqueous solution of the leuco form of a vat dye, then converting the dye to a colored insoluble form within the lens.

All these techniques which result in a colorant dispersed in insoluble form within the lens are subject to the problems of migration and leaching of the colorant either during wear or during the sterilizing process.

Accordingly, attempts have been made to insolubilize a colorant within a contact lens by covalent bonding to the polymer backbone.

Tanaka, U.S. Pat. No. 4,157,892, Japanese Published Unexamined Patent Application 74/113,846, and Japanese Unexamined Patent Application 74/80,190 disclose processes wherein a color coupler covalently bonded to a polymerizable monomer is copolymerized with the structural monomers of the contact lens, and the coupler is subsequently reacted with a dye-forming reagent.

Erickson, U.S. Pat. No. 4,093,361, and British Patent 1,400,892 disclose processes wherein a vinyl comonomer having a covalently bonded dye is copolymerized with the structural monomers of the lens to provide a lens having a dye covalently bonded to the polymer backbone.

Hydrophilic contact lenses of the copolymerized dye or coupler type can suffer from incomplete reaction of the monomer, which results in a lens wherein the monomer colorant may be leached from the lens, with the undesirable consequences of fading, migration and/or eye irritation.

British Patent Application 2,105,061 discloses a method of tinting contact lenses wherein a reactive dye, e.g. a vinyl sulfone dye, is contacted with the contact lens under conditions wherein the dye reacts with the hydroxyl groups of the hydrophilic monomer. While the use of reactive dyes is an effective means of coloring hydrophilic contact lenses, the process disclosed in British Patent Application 2,105,061 does not disclose coloring contact lenses incorporating a substantial amount of N-vinylpyrrolidone monomer. Furthermore the treatment conditions for reacting the dye with the lens involve exposure of the lens to relatively severe conditions such as contact with relatively strong acids and bases.

Hence a need has continued to exist for a simple process for tinting hydrophilic soft contact lenses made from copolymers which include a substantial proportion of N-vinylpyrrolidone in the copolymer and for tinting such lenses under mild conditions.

SUMMARY OF THE INVENTION

Accordingly, it is an object of the invention to provide a method for tinting hydrophilic soft contact lenses.

A further object is to provide a method for tinting hydrophilic contact lenses which subjects the lenses to mild treating conditions.

A further object is to provide a method of tinting contact lenses using reactive dyes.

A further object is to provide a method of tinting contact lenses which provides a permanent color.

Further objects of the invention will become apparent from the description of the invention which follows.

The objects of the invention are achieved by a process of tinting hydrophilic contact lenses comprising impregnating a contact lens comprised of a synthetic resin containing substantial proportions of a hydroxyl group-containing acrylic ester and N-vinylpyrrolidone with an aqueous solution of a dichlorotriazine dye, and contacting the impregnated lens with an aqueous alkaline solution for a period of time sufficient to fix the dye within the lens.

The lenses tinted by the process of this invention comprise a copolymer hydrogel containing substantial proportions of a hydroxyl group-containing monomer residues and N-vinylpyrrolidone residues and having a dichlorotriazine reactive dye bonded to the polymer backbone through ether groups.

DETAILED DESCRIPTION OF THE INVENTION AND PREFERRED EMBODIMENTS

The dichlorotriazine dyes used in the process of this invention are those characterized by the general formula

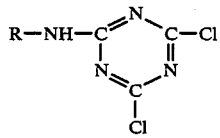

wherein R represents a chromaphore radical which provides the dye with its characteristic light absorption. The chromophore radical of the reactive dichlorotrazine dye may be any radical which is not incompatible with the dichlorotriazine nucleus and has an appropriate absorption spectrum. Thus dye radicals of the azo, metallized-azo, anthraquinone, phthalocyanine complex, and metal-complexed formazon types are suitable. Dichlorotriazine dyes are commercially available from Imperial Chemical Industries, Ltd., under their tradename Procion M.

Suitable dichlorotriazine reactive dyes include Color Index (CI) Reactive Blue 140, CI Reactive Blue 163, CI Reactive Blue 109, CI Reactive Blue 4, CI Reactive Yellow 86, CI Reactive Yellow 14, CI Reactive Yellow 22, CI Reactive Yellow 7, Procion Yellow M4RF, Procion Yellow MX-2GA, CI Reactive Orange 4, Procion Orange MX-G, CI Reactive Red 11, CI Reactive Red 1, CI Reactive Red 2, CI Reactive Red 6, and Procion Black MX-CWA.

Preferred dichlorotriazine dyes include CI Reactive Blue 163, CI Reactive Red 2, CI Reactive Red 11, CI Reactive Blue 140, CI Reactive Yellow 86 and Procion Black MX-CWA.

The dichlorotriazine dyes are the most reactive of the available reactive dyes as determined by comparative dyeing of cellulose. This allows the use of lower temperatures and lower pH to effect a reaction.

The soft hydrophilic contact lenses which can be colored by the process of this invention are those which are interpolymers of acrylic esters containing hydroxyl groups such as hydroxyethyl methacrylate (HEMA) and N-vinylpyrrolidone. The interpolymers may also incorporate a cross-linking agent such as divinylbenzene and other ethylenically unsaturated monomers such as methyl methacrylate to provide desirable physical characteristics to the contact lens. While the hydrophilic contact lenses to be tinted by the process of this invention must contain a substantial proportion of an OH group-containing monomer such as HEMA in order to provide sites for bonding of the reactive dye to the polymer, surprisingly, pure HEMA lenses are not satisfactorily dyed by the process of this invention. It has been found that a substantial proportion of N-vinylpyrrolidone must be present in the lens in order for it to be dyeable by the process of this invention. The process of this invention is especially useful in tinting contact lenses of the type disclosed in U.S. Pat. No. 4,123,407. Such hydrophilic contact lenses typically contain from about 93.8 to about 51.8% by weight of an ester of acrylic or methacrylic acid and a polyhydric alcohol, from about 1 to about 6% by weight of a copolymerizable monomer selected from the group consisting of alkyl acrylates and methacrylates and vinyl esters of monocarboxylic acids, about 5 to about 40% by weight of N-vinylpyrrolidone, and from about 0.2 to about 2.2% by weight of divinylbenzene or divinyltoluene.

In the process of this invention the hydrophilic lens to be dyed, in a water-swollen state, is immersed in an aqueous solution of a dichlorotriazine dye maintained at a pH which reduces to near zero the rate at which the dye hydrolyses or reacts with the hydroxyl groups of the hydrophilic polymer from which the lens is made. This solution should have an approximately neutral pH. In any case the pH of the dye solution should not exceed 8.0. The dye solution may be slightly acidic, but strongly acidic dye solutions are to be avoided. Under these conditions the reactive dyes diffuse into the lens.

The impregnated lens is then immersed in a fixing solution which is a basic aqueous solution having a pH greater than 8.0. The diffusion of the basic solution into the impregnated lens increases the pH of the aqueous medium within the lens to a point at which the hydroxyl groups of the hydrophilic monomer will react with the dichlorotriazine dye to form covalent bonds. The lens is then thoroughly washed to remove any unreacted dye and stored under the usual conditions for hydrophilic contact lenses.

In a preferred embodiment of the invention the aqueous dye solution may incorporate up to 20% by weight of N-methylpyrrolidinone or ethanol. The use of such a dye solution causes more of the dye to be incorporated into the lens.

The concentration of the aqueous dye solution used for impregnating the lens may range from 0.1% to about 5% by weight of dye. A preferred range is from 1% to 3% by weight. A more preferred concentration is about 1% by weight.

The temperature for conducting the impregnation step and the reaction step may range from 0° C. to 100°

C. The process is most conveniently conducted at room temperature.

The time required to impregnate the lens with the dye in the impregnation step is generally from 5 minutes to one hour, preferably from 15 to 30 minutes. The time for the second step of the process, namely contacting the impregnated lens with the basic aqueous solution, is not critical. The lens should be contacted with the basic solution for a period of time sufficient to assure reaction of as much of the dichlorotriazine dye with the polymer as is conveniently possible. Contact times will generally range from about 15 minutes to several hours at room temperature. It will be understood by those skilled in the art that the rate of diffusion of reagents and the rate of reaction vary greatly with temperature. Therefore the periods for conducting the impregnation step and the fixing step will vary with the temperature. The best conditions for use with a given dye and a given contact lens are readily determined by the skilled practitioner by routine experimentation.

The basic fixing solution should have a pH greater than 8.0. It is preferred that the pH be no greater than 10.0, since it is believed that exposure of the hydrophilic contact lens to a pH greater than 10.0 may cause some deterioration of the lens or changes in lenses especially with lenses of substantial methacrylic acid content.

Any water-soluble base may be used as the pH adjusting ingredient in the basic aqueous fixing solution of this invention. It is preferred to use sodium carbonate as the base. The impregnated lens may be exposed to the basic fixing solution by removing it from the aqueous dye solution and immersing it in the basic fixing solution, or the pH of the aqueous dye solution may be adjusted by adding base, e.g., sodium carbonate thereto. It is preferred to remove the lens from the aqueous dye solution and wash off the excess dye solution and subsequently to immerse the lens in the basic fixing solution.

After the fixing step it is preferable to immerse the tinted lens in an aqueous bath at elevated temperature for a period of time to remove dye, unreacted to the lens polymer, from the lens and complete the dye-fixing reaction. Immersion in boiling water or physiological saline solution, or even treating in an aqueous medium in an autoclave at elevated pressure and temperatures above 100° C., but not high enough to damage the contact lens, may be used to leach excess dye from the lens. It is an advantage of the tinted contact lenses prepared by the procedures of this invention that the excess dye can be removed by soaking in an aqueous medium at elevated temperatures, whereas leaching unpolymerized monomers from the lens is more difficult.

The process of this invention exposes the hydrophilic contact lenses to a pH no greater than 10. It is believed that exposure to high pH may contribute to some deterioration in the structure of the polymer from which the lens is formed. Any possible deterioration from this cause is avoided by the process of this invention.

In the process of this invention, one of the chlorine substituents of the dichlorotriazine moiety of the reactive dye reacts with the hydroxyl groups of the hydrophilic polymer to form ether bonds. The dye molecules accordingly become covalently bound to the polymer backbone through ether bonds. The residual chlorine substituent most likely becomes hydrolyzed during the subsequent fixing step.

Having now described the invention the same will be more easily understood by reference to the following examples which are presented for illustration and are not to be considered as limiting.

EXAMPLE 1

This example illustrates tinting of soft contact lenses with dichlorotriazine dyes.

The following procedure was used to dye soft hydrophilic contact lenses made according to Example 3 of U.S. Pat. No. 4,123,407.

1. Each lens was soaked for a period of one-half hour in a 1% solution of a dichlorotriazine dye (Procion M, sold by Imperial Chemical Industries, Ltd.) in a solution of 20% ethanol in water to impregnate the lens with the dye solution. The initial pH of the dye solution was 7.0.

2. The impregnated lens was washed with water to remove excess tinting solution.

3. The washed lens was then immersed in a fixing solution comprising an aqueous solution of sodium carbonate (pH=10) for a period of one hour.

4. The lens was then flushed with water or, in some cases, allowed to stand for 15 minutes in an aqueous 0.9% sodium chloride solution.

5. The lens was then heated in water in an autoclave at a pressure of 15 psig for one hour to complete the dye fixing reaction and remove unfixed dye from the lens.

6. The lens was then stored in a physiological saline solution.

The intensity of color obtained was evaluated visually. Satisfactory dyeing was obtained using the dyes CI Reactive Blue 163, CI Reactive Blue 140, CI Reactive Red 2, CI Reactive Red 11, CI Reactive Yellow 86, and Procion Black MX-CWA.

EXAMPLE 2

This example illustrates tinting of contact lenses by the process of this invention using vinylsulfone reactive dyes.

The procedure of Example 1 was repeated using the vinylsulfone reactive dyes CI Reactive Yellow 15, CI Reactive Orange 78, CI Reactive Blue 21, and CI Reactive Black 5. Only lightly colored lenses were obtained which were unsatisfactory for use as tinted contact lenses. The intensity of coloration was not very reproducible, and non-uniformity of coloration was noted in some instances.

These results indicate that contact lenses of the type disclosed in U.S. Pat. No. 4,123,407 cannot be successfully tinted using the reactive dyes disclosed in British Patent Application 2,105,061 in the preferred process of this invention.

EXAMPLE 3

This example illustrates the fastness of the tinting produced by the process of this invention.

The central portions of a series of hydrophilic contact lenses prepared according to Example 3 of U.S. Pat. No. 4,123,407 were tinted by the following process.

Each contact lens was removed from its storage solution (physiological saline), padded dry and placed in a holder, base curve up. One drop of an aqueous solution of a dichlorotriazine reactive dye (1% by weight) was placed in the center of the lens using a dropper so as to cover the zone of the lens intended to be tinted, i.e., most of the optical zone. The drop was allowed to remain on the lens for 5-15 minutes, depending on the intensity of tinting desired. The drop was then washed off and the lens was inspected. The application of the dye solution was repeated if the intensity was not great enough until the desired tint was attained. The lens was then immersed in the fixative solution (aqueous solution of sodium carbonate, pH=10) for about one hour. The lens was then rinsed in distilled water and heated to 100° C. in water for 30 minutes to complete the dye fixation and remove any unfixed dye. The lenses were then stored in physiological saline solution. To test the permanence of the tinting the lenses were heated in water in an autoclave for 15 minutes at 15 psig, and then the intensity of the tint was evaluated. Each lens was subjected to up to five autoclaving cycles. The lenses were also tested for fastness by soaking in an aqueous detergent solution of the type used for cleaning soft contact lenses and in an enzymatic cleaning solution.

Table 1 summarizes the results of the tinting with variation of the conditions and of the testing for fastness.

The procedure of Example 1 was repeated using soft contact lenses comprised of a polymer of ethylene glycol monomethacrylate cross-linked with a small amount of ethylene glycol dimethylacrylate (EGMDA). The colors obtained were very light and the tinted contact lenses obtained were generally unsatisfactory.

EXAMPLE 6

This example illustrates the facility by which higher water content lenses containing substantial quantities of N-vinylpyrrolidone may be tinted using the dichlorotriazine dyes.

Hydrated lenses prepared according to Example II of U.S. Pat. No. 3,937,680 are tinted in a similar manner to Example 3 using separately dyes CI Reactice Blue 140, CI Reactive Blue 163, CI Reactive Yellow 86, CI Reactive Red 2, CI Reactive Red 11 and Procion Black

TABLE 1

| | TREATMENT REGIMEN | | | | | PERMANENCE TESTS | | | | | | |
|---|---|---|---|---|---|---|---|---|---|---|---|---|
| Dye CI Reactive | Soak Time min | H₂O Rinse | Fix Time min | H₂O Rinse | Boil in Saline | Autoclaving 15 min at 15 psig | | | | | Preflex Soak | Enzyme Cleaner Soak |
| | | | | | | 1 cycle | 2 cycles | 3 cycles | 4 cycles | 5 cycles | | |
| Blue 163 | 15 | x | 60 | x | OK | OK | OK | OK | OK | OK | OK | OK |
| Blue 163 | 15 | x | 6 | x | OK | OK | OK | OK | OK | OK | OK | OK |
| Blue 163 | 5 | x | 6 | x | OK | OK | OK | OK | OK | OK | OK | OK |
| Blue 163 | 15 | x | None | x | LMC | LMC | | | | | | |
| Blue 163 | 5 | x | None | x | LMC | LMC | | | | | | |
| Blue 140 | 15 | x | 60 | x | OK | OK | OK | OK | OK | OK | OK | OK |
| Red 2 | 15 | x | 60 | x | OK | OK | OK | OK | OK | OK | OK | OK |
| Red 11 | 15 | x | 60 | x | OK | OK | OK | OK | OK | OK | OK | OK |
| Yellow 86 | 15 | x | 60 | x | OK | OK | OK | OK | OK | OK | OK | OK |
| Procion black MX-CWA | 15 | x | 60 | x | OK | OK | OK | OK | OK | OK | OK | OK |
| *Green | 15 | x | 60 | x | OK | OK | OK | OK | OK | OK | OK | OK |
| Blue 140 | 15 | x | None | x | LMC | LMC | | | | | | |
| Red 2 | 15 | x | None | x | LMC | LMC | | | | | | |
| Red 11 | 15 | x | None | x | LAC | | | | | | | |
| Yellow 86 | 15 | x | None | x | LMC | LMC | | | | | | |
| Procion black MX-CWA | 15 | x | None | x | LMC | | | | | | | |
| *Green | 15 | x | None | x | LAC | | | | | | | |

LMC = Lost Most Color
LAC = Lost All Color
OK = Color retained
*Green = Mixture of Blue 163 and Yellow 86

EXAMPLE 4

This Example illustrates a variation of the process of this invention.

CI Reactive Blue 163 (500 mg) was dissolved in 20 ml of 0.9% by weight aqueous sodium chloride solution (physiological saline). A contact lens made according to Example 3 of U.S. Pat. No. 4,123,407 was immersed in the solution and allowed to stand for 10-15 minutes. The solution was then adjusted to pH 10.4 by adding 0.1613 g of anhydrous sodium carbonate. The adjustment of the pH of the solution took 10-15 minutes, and the lens was allowed to stand in the basic solution for another 45 minutes. At this time the pH of the solution was 10.0. The lens was then removed from the basic fixing solution and allowed to stand in physiological saline overnight. The color was retained by the lens. The lens was then heated in saline at 100° C. for 30 minutes, and was found to retain its color after this treatment.

EXAMPLE 5

This example illustrates the coloring process of this invention applied to soft contact lenses devoid of N-vinylpyrrolidone.

MXG.

In all cases a cosmetically acceptable permanently colored contact lens is obtained.

EXAMPLES 7-35

These examples further show the variation between reactive dyestuffs of the dichlorotriazine type, monochlorotriazine and vinyl sulphonyl type when applied to lenses of the type of U.S. Pat. No. 4,123,407 Example 3 and lenses of the type in Example 5 above.

Lenses were immersed in aqueous dye solutions containing 1 g/c.c of dye for 15 minutes. These were then rinsed with water and placed into sodium carbonate solution of pH=9.5 for one hour. The lenses were then rinsed in water, and placed in 0.9% sodium chloride solution and aseptized.

The lenses were evaluated visually and also by spectrophotometry as follows.

The absorption of the chromophore peak in the visible region was measured on a Beckman SP25 spectrophotometer from which an estimate on the quantity of dye reacting to the lens was made. For a satisfactory coloration to be imparted to the lens at least $10^{-5}$ g is required to be reacted. Table 2 summarizes the results obtained. The limit of detection was $2 \times 10^{-7}$ g/lens.

Amounts less than the detection limit are listed in the table as 0.

It is clear from inspection of the table that only the dichlorotriazine dyes provide satisfactory tinted lenses.

TABLE 2

Comparison of the Reactivity of Different Reactive Dyes to Soft Lens Material

| Example # | Dye ID | Reactive Dye Type | Lens of Example II, U.S. Pat. No. 4,123,407 | | Lens of Example 5 | |
|---|---|---|---|---|---|---|
| | | | Visual Evaluation | g Reacted | Visual Evaluation | g Reacted |
| 7 | CI Reactive Blue 140 | Dichlorotriazine | good | $4.3 \times 10^{-5}$ | poor | $4.2 \times 10^{-6}$ |
| 8 | CI Reactive Blue 163 | " | good | $2.5 \times 10^{-5}$ | none | 0 |
| 9 | CI Reactive Blue 109 | " | good | $2.4 \times 10^{-5}$ | none | 0 |
| 10 | CI Reactive Blue 4 | " | good | $1.3 \times 10^{-5}$ | poor | $2.4 \times 10^{-6}$ |
| 11 | CI Reactive Yellow 86 | " | good | $5.6 \times 10^{-5}$ | poor | $2.4 \times 10^{-6}$ |
| 12 | CI Reactive Yellow 14 | " | good | $1.4 \times 10^{-5}$ | none | 0 |
| 13 | CI Reactive Yellow 22 | " | fair | $1.0 \times 10^{-5}$ | none | 0 |
| 14 | CI Reactive Yellow 7 | " | good | $3.1 \times 10^{-5}$ | poor | $2.4 \times 10^{-7}$ |
| 15 | Procion Yellow M4RF | " | good | $2.8 \times 10^{-5}$ | none | 0 |
| 16 | Procion Yellow MX-2GA | " | good | $9.0 \times 10^{-5}$ | fair | $1.1 \times 10^{-5}$ |
| 17 | CI Reactive Orange 4 | " | good | $2.5 \times 10^{-5}$ | poor | $1.4 \times 10^{-6}$ |
| 18 | Procion Orange MX-G | " | good | $3.7 \times 10^{-5}$ | poor | $1.8 \times 10^{-6}$ |
| 19 | CI Reactive Red 11 | " | good | $4.7 \times 10^{-5}$ | poor | $6.2 \times 10^{-7}$ |
| 20 | CI Reactive Red 1 | " | good | $2.2 \times 10^{-5}$ | poor | $3.0 \times 10^{-7}$ |
| 21 | CI Reactive Red 2 | " | good | $4.1 \times 10^{-5}$ | fair | $2.3 \times 10^{-5}$ |
| 22 | CI Reactive Red 6 | " | good | $2.0 \times 10^{-5}$ | poor | $6.2 \times 10^{-7}$ |
| 23 | Procion Black MX-CWA | " | good | $1.5 \times 10^{-5}$ | poor | $3.0 \times 10^{-7}$ |
| 24 | CI Reactive Blue 21 | Vinyl sulfonyl | fair | $8.4 \times 10^{-6}$ | poor | 0 |
| 25 | CI Reactive Black 5 | " | poor | 0 | poor | 0 |
| 26 | CI Reactive Yellow 15 | " | poor | $3.6 \times 10^{-6}$ | poor | 0 |
| 27 | CI Reactive Orange 78 | " | poor | $1.5 \times 10^{-6}$ | poor | 0 |
| 28 | CI Reactive Orange 13 | Monochlorotriazine | poor | 0 | poor | 0 |
| 29 | CI Reactive Red 29 | " | poor | 0 | poor | 0 |
| 30 | CI Reactive Red 58 | " | poor | $3.0 \times 10^{-7}$ | poor | 0 |
| 31 | CI Reactive Red 31 | " | poor | $3.0 \times 10^{-7}$ | poor | 0 |
| 32 | CI Reactive Red 120 | " | poor | $3.0 \times 10^{-6}$ | poor | 0 |
| 33 | CI Reactive Violet 1 | " | poor | 0 | poor | 0 |
| 34 | CI Reactive Blue 180 | " | poor | 0 | poor | 0 |
| 35 | Procion Brown HERA | " | poor | $3.0 \times 10^{-7}$ | poor | 0 |

EXAMPLES 36–42

These examples illustrate the role played by the N-vinylpyrrolidone moiety in enhancing the reaction of the dichlorotriazine to the lens polymer.

A series of hydrophilic polymers was prepared according to the teachings of U.S. Pat. No. 4,123,407 wherein the ratio of N-vinylpyrrolidone/hydroxyethyl methacrylate was varied from 1/96 to 15/82. Lenses prepared from such polymers were tinted in a manner according to Example 4 using CI Reactive Blue 163. Table 3 gives the results of these tests.

These results show that hydrophilic interpolymers based on hydroxyethyl methacrylate and N-vinylpyrrolidone which contain less than about 5% by weight of N-vinylpyrrolidone residues cannot be satisfactorily dyed under the mild conditions of the process of this invention.

TABLE 3

Comparison of Reactivity of Dyes to Hydrogels of Different N—Vinylpyrrolidone Content

| EXAMPLE | Ratio VP:HEMA In Hydrogel | Reactivity with CI Reactive Blue 163 | |
|---|---|---|---|
| | | Visual | g/lens Reacted |
| 36 | 1:96 | poor | $<2 \times 10^{-7}$ |
| 37 | 2:94 | poor | $<2 \times 10^{-7}$ |
| 38 | 5:91 | fair | $2.4 \times 10^{-6}$ |
| 39 | 7:89 | fair | $4.8 \times 10^{-6}$ |
| 40 | 10:86 | good | $9.6 \times 10^{-6}$ |
| 41 | 12:84 | good | $1.3 \times 10^{-5}$ |

TABLE 3-continued

Comparison of Reactivity of Dyes to Hydrogels of Different N—Vinylpyrrolidone Content

| EXAMPLE | Ratio VP:HEMA In Hydrogel | Reactivity with CI Reactive Blue 163 | |
|---|---|---|---|
| | | Visual | g/lens Reacted |
| 42 | 15:82 | good | $2.5 \times 10^{-5}$ |

Having now fully described the invention it will be apparent that many modifications and changes can be made therein without departing from the spirit and scope of the invention.

What is claimed as new and sought to be protected by Letters Patent of the United States is:

1. A process for coloring hydrophilic soft contact lenses comprised of a synthetic resin containing substantial proportions of an hydroxyl group-containing acrylic ester and N-vinylpyrrolidone comprising
   impregnating the lens with an aqueous solution of a dichlorotriazine dye, and
   contacting the impregnated lens with an aqueous alkaline solution for a period of time sufficient to fix the dye within the lens.
2. The process of claim 1 wherein the concentration of the dye solution is 0.1–5% by weight.
3. The process of claim 1 wherein the concentration of the dye solution is about 1% by weight.
4. The process of claim 1 wherein said aqueous alkaline solution has a pH no greater than 11.
5. The process of claim 1 wherein said aqueous alkaline solution has a pH no greater than 10.
6. The process of claim 1 wherein said aqueous alkaline solution is a solution of sodium carbonate.

7. The process of claim 1 wherein the impregnated lens from step 1 is washed before being contacted with the aqueous alkaline solution.

8. The process of claim 1 wherein said dichlorotriazine dye is selected from the group consisting of CI Reactive Blue 163, CI Reactive Red 2, CI Reactive Red 11, CI Reactive Blue 140, CI Reactive Yellow 86 and Procion Black MX-CWA.

9. A hydrophilic soft contact lens comprised of a synthetic resin containing substantial proportions of an hydroxyl group-containing acrylic ester and N-vinylpyrrol-idone which has been tinted by a process comprising impregnating said lens with an aqueous solution of a dichlorotriazine dye, and contacting the impregnated lens with an aqueous alkaline solution for a period of time sufficient to fix the dye within the lens.

10. The lens of claim 9 wherein the concentration of the dye solution is 0.1–5% by weight.

11. The lens of claim 9 wherein the concentration of the dye solution is about 1% by weight.

12. The lens of claim 9 wherein said aqueous alkaline solution has a pH no greater than 11.

13. The lens of claim 9 wherein said aqueous alkaline solution has a pH no greater than 10.

14. The lens of claim 9 wherein said aqueous alkaline solution is a solution of sodium carbonate.

15. The lens of claim 9 wherein the impregnated lens from step 1 is washed before being contacted with the aqueous alkaline solution.

16. The lens of claim 9 wherein said dichlorotriazine dye is selected from the group consisting of CI Reactive Blue 163, CI Reactive Red 2, CI Reactive Red 11, CI Reactive Blue 140, CI Reactive Yellow 86 and Procion Black MX-CWA.

17. A tinted hydrophilic contact lens comprising an interpolymer hydrogel containing substantial proportions of residues of an hydroxyl group-containing monomer and vinylpyrrolidone residues and having a dichlorotriazine reactive dye bonded to the polymer through ether groups.

18. The contact lens of claim 17 wherein the proportion of hydroxyl group-containing monomer residues is from about 93.8 to about 50% by weight and the proportion of N-vinylpyrrolidone monomer residues is from about 5 to about 50% by weight.

19. The contact lens of claim 18 wherein the proportion of vinylpyrrolidone monomer residues is from about 12 to about 18% by weight.

20. The contact lens of claim 17 wherein said reactive dichlorotriazine dye is selected from the group consisting of CI Reactive Blue 163, CI Reactive Red 2, CI Reactive Red 11, CI Reactive Blue 140, CI Reactive Yellow 86 and Procion Black MX-CWA.

* * * * *